«12» United States Patent
Quinn et al.

(10) Patent No.: US 8,484,312 B2
(45) Date of Patent: Jul. 9, 2013

(54) SYSTEM AND METHOD FOR INFORMATION HANDLING SYSTEM WIRELESS NETWORK PRECONFIGURATION

(75) Inventors: Liam Quinn, Austin, TX (US); Liam Prendergast, Limerick (IR)

(73) Assignee: Dell Products L.P., Round Rock, TX (US)

( * ) Notice: Subject to any disclaimer, the term of this patent is extended or adjusted under 35 U.S.C. 154(b) by 867 days.

(21) Appl. No.: 12/636,224

(22) Filed: Dec. 11, 2009

(65) Prior Publication Data
US 2011/0145359 A1   Jun. 16, 2011

(51) Int. Cl.
*G06F 15/16* (2006.01)

(52) U.S. Cl.
USPC ......................................................... 709/217

(58) Field of Classification Search
USPC ........................... 709/217, 224, 238; 375/350
See application file for complete search history.

(56) References Cited

U.S. PATENT DOCUMENTS

| | | | |
|---|---|---|---|
| 6,904,110 B2 * | 6/2005 | Trans et al. | 375/350 |
| 7,111,072 B1 * | 9/2006 | Matthews et al. | 709/238 |
| 7,444,398 B1 * | 10/2008 | Matthews | 709/224 |

* cited by examiner

*Primary Examiner* — Tammy Nguyen
(74) *Attorney, Agent, or Firm* — Terrile, Cannatti, Chambers & Holland, LLP; Robert W. Holland

(57) ABSTRACT

Manufacture of an information handling system that includes wireless service through a wireless wide area network includes an image having an operating system with a wireless service provider registry entry and an end user wireless service entry. The registry entries are applied upon power up to automatically configure the information handling system's wireless radio to interface with a wireless service and to provision the information handling system on the wireless service. Updates to the wireless service are provided by updates to the registry entries.

18 Claims, 2 Drawing Sheets

SYSTEM AND METHOD FOR INFORMATION HANDLING SYSTEM WIRELESS NETWORK PRECONFIGURATION

BACKGROUND OF THE INVENTION

1. Field of the Invention

The present invention relates in general to the field of information handling system networking, and more particularly to a system and method for information handling system wireless network preconfiguration.

2. Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Individuals and enterprises who purchase information handling systems have sought systems of smaller size and greater mobile flexibility. Smaller-sized information handling systems typically come in the form of portable systems that have integrated input/output devices and an integrated power source. As an example, a typical portable information handling system is built in a housing having a rotationally coupled lid that resembles a clamshell. The lid includes a liquid crystal display (LCD) while the housing includes a keyboard and a battery. With a charged battery, a portable information handling system allows an end user convenience and mobility by eliminating a need for the end user to have a connection to a fixed asset, such as a power outlet or peripheral display and keyboard. In order to allow networking in a mobile configuration, portable information handling systems often include wireless networking capabilities, such as wireless local area network (LAN) capabilities compliant with IEEE standard 802.11(b) or (g). Wireless LAN capabilities allow an end user to interact with local hotspots that are often found in airports and stores.

One difficulty with relying upon wireless LAN hotspots is that such hot spots typically have a relatively limited range. For example, wireless LAN access is not typically available on roads and highways or outside of population centers. In response to this limitation, end users have turned to wireless wide area networks (WAN) that support access over greater ranges. Wireless WANs typically rely upon cellular telephone networks to transmit data. To accomplish this, an information handling system essentially has a cellular telephone transceiver built into its housing. The transceiver is provisioned for access to a cellular telephone network provider using a protocol of the provider, such as GSM 1-G through 4G or CDMA. In addition to existing cellular telephone networks, new wireless technologies have come to market, including 4G, LTE, Mobile WiMax, and GOBI, which provides universal silicon so that a single wireless WAN card can support both GSM or CDMA wireless network interactions. One difficulty with the use of wireless WAN communications integrated within an information handling system is that an end user typically must provision the information handling system to interact with a desired network. Provisioning steps can vary widely depending upon the type of network and the provider of network services. In some instances, provisioning to a wireless WAN presents such a challenge that end users elect not to use wireless WAN services rather than mess with the provisioning steps.

SUMMARY OF THE INVENTION

Therefore a need has arisen for a system and method which provisions an information handling system to interact with a wireless WAN with minimal end user interaction.

In accordance with the present invention, a system and method are provided which substantially reduce the disadvantages and problems associated with previous methods and systems for provisioning an information handling system to interact with a wireless WAN. Registry files are created for each of plural supported wireless network carrier services. Information handling systems that include a wireless transceiver of a supported wireless service have an image loaded that includes the registry values associated with the wireless service. On initial startup, the registry values are applied at the information handling system to provision wireless service.

More specifically, an end user orders an information handling system for manufacture by communicating purchasing information to an order engine on an information handling system. Orders that include wireless network service through a wireless wide area network transceiver have an image prepared to load on the information handling system with a wireless service provider registry entry and an end user wireless registry entry. The wireless service provider registry entry is selected from a database that includes a registry entry for each of plural wireless service providers. Each wireless service registry entry includes information to support automated provision of the wireless transceiver to communicate over the associated wireless wide area network. For example, the wireless service provider registry entry is selected by assigning a SKU to each registry entry and including the SKU in an order for an information handling system that includes wireless network service. An end user wireless registry entry is generated from the purchasing information and applied at power up of the information handling system to complete automated provision of wireless networking at the information handling system.

The present invention provides a number of important technical advantages. One example of an important technical advantage is that integrated wireless WAN devices are available with an information handling system on initial power up of the information handling system. Variations to configuration information for end user and network providers are managed at manufacture so that an information handling system initially powers up ready to interact with the network provider using the end users' account information without requiring end user inputs. Managing end user and network provider information during manufacture of the information handling system by using registry entries allows loading of an image onto the information handling system that is preprovisioned to interact with the end user's wireless network provider's network. Further, the use of registry files avoids the need to identify numerous wireless WAN components with separate SKUs for use in the production of information handling systems, and supports mode configuration of multimode technology devices as desired for particular markets and end users to allow rapid adaptation to new network capabilities, features and service provider limitations.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

DETAILED DESCRIPTION

Automated installation, configuration and provision of wireless wide area networking capability to an information handling system provides out-of-the-box wireless networking with little if any end user actions upon initial power up of the information handling system. For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, and a video display. The information handling system may also include one or more buses operable to transmit communications between the various hardware components.

Figure 1:
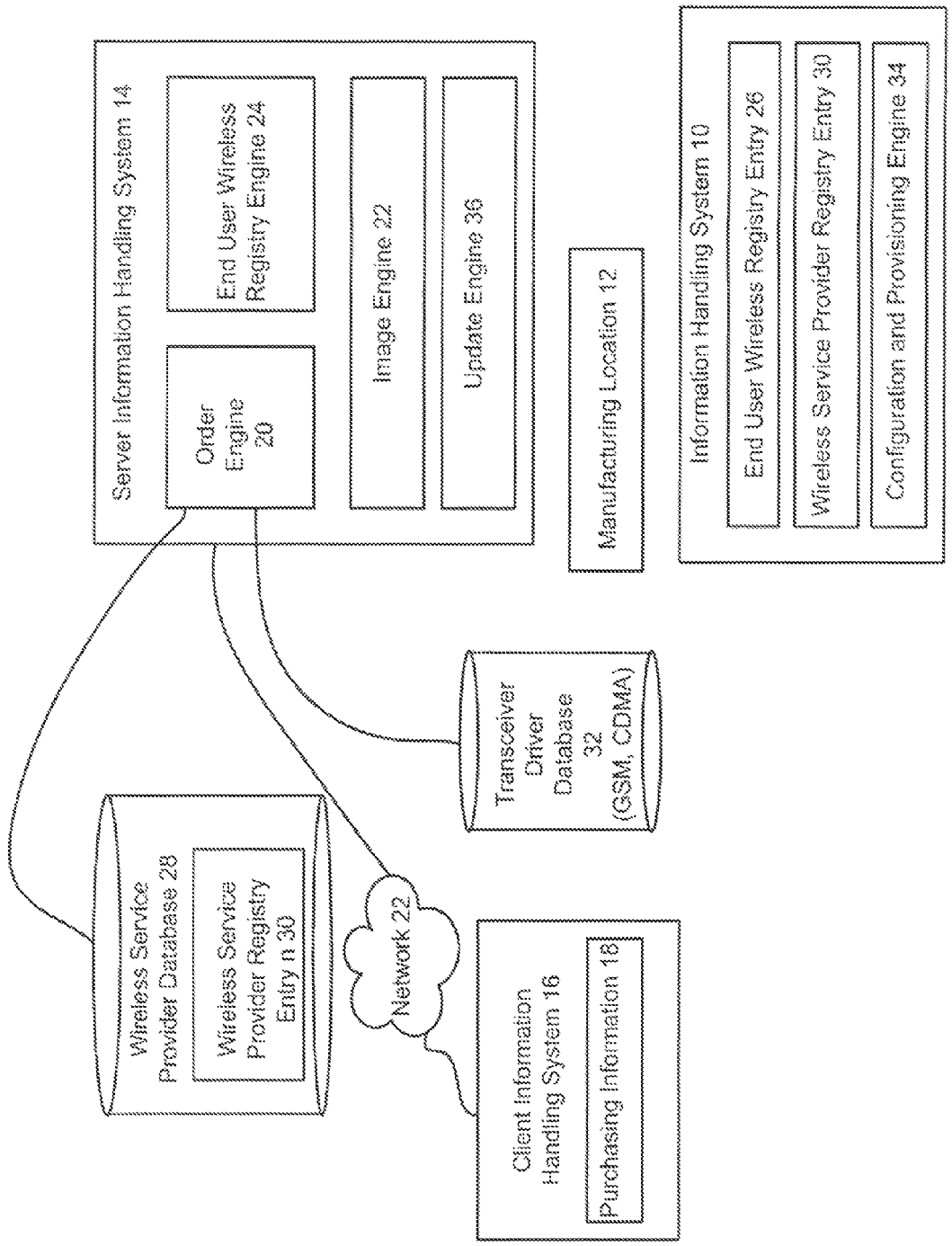
FIG. 1 depicts a block diagram of a system for manufacture of an information handling system having wireless wide area network capability installed, configured and provisioned upon initial start up by an end user purchaser.

Referring now to FIG. 1, a block diagram depicts a system for manufacture of an information handling system 10 having wireless wide area network capability installed, configured and provisioned upon initial start up by an end user purchaser. Information handling system 10 is built at a manufacturing location 12 based upon an end user purchase order received at a server information handling system 14 from a client information handling system 16. An end user places an order for an information handling system by providing purchasing information 18 to an order engine 20, such as instructions executing on server information handling system 14. As an example, the order with purchase information 18 is placed through a network 22, such as the Internet. Order engine 20 creates a manifest that defines the hardware and software components used to build information handling system 10 and forwards the manifest to manufacture location 12. For purposes of the present example embodiment, purchasing information 18 includes a wireless carrier service that the end user desires to include in information handling system 10, such as wireless wide area network service provided by a selected of plural wireless carriers using a transceiver integrated in information handling system 10.

In order to support manufacture of information handling system 10, order engine 20 applies purchasing information 18 to define components of an image for information handling system 10 so that an image engine 22 can prepare the image to copy to information handling system 10. Order engine 20 provides the purchasing information to an end user wireless registry engine 24, which analyzes the purchasing information to generate an end user wireless registry entry 26 for inclusion to the image. For example, end user wireless registry engine 24 gathers account information for the end user to determine the wireless carrier service selected by the end user, the protocol for the wireless transceiver of information handling system 10, the wireless access point and DNS for use to configure and provision the transceiver, and other related information desired or needed for configuring and provisioning the wireless transceiver to interact with a wireless wide area network. Once end user wireless registry engine 24 generates an end user wireless registry entry 26, the end user wireless registry entry 26 is included by image engine 22 in the image for copying to information handling system 10. In addition, image engine 22 selects a wireless service provider registry entry 30 form wireless service provider registry database 28 that has provisioning information for the wireless carrier service selected by the end user and copies the wireless service provider registry entry to the image of information handling system 10. Wireless service provider database 28 includes at least one wireless service provider registry entry for each available wireless service provider. Including the wireless service provider registry entry 30 as a registry entry in an image of information handling system 10 ensures that information handling system 10 has provisioning information available at initial power up to provision to the wireless service provider associated with the registry entry. Image engine 22 also includes a wireless transceiver driver in the image that is selected from a wireless transceiver database 32, such as a driver that provides GSM or CDMA operations for a GOBI transceiver having hardware to interact with either protocol.

At manufacture of information handling system 10, the image from image engine 22 is copied to information handling system 10. The image includes an operating system that has wireless service provider registry entry 30 and end user wireless registry entry 26 that, together, define the information needed for configuring and provisioning wireless wide area network service to information handling system 10. A configuration and provisioning engine 34 included in the image initiates on initial power up of information handling system 10 to automatically apply the registry entries to configure and provision wireless wide area network service to information handling system 10 without the need for end user input. Configuration and provisioning engine 34 periodically interfaces with an update engine 36 of server information handling system 14 to download updates to the end user wireless registry entry and the wireless service provider registry entry stored in the operating system of information handling system 10. In this manner, wireless wide area network operations are kept up to date as services on a wireless wide area network change.

Figure 2:
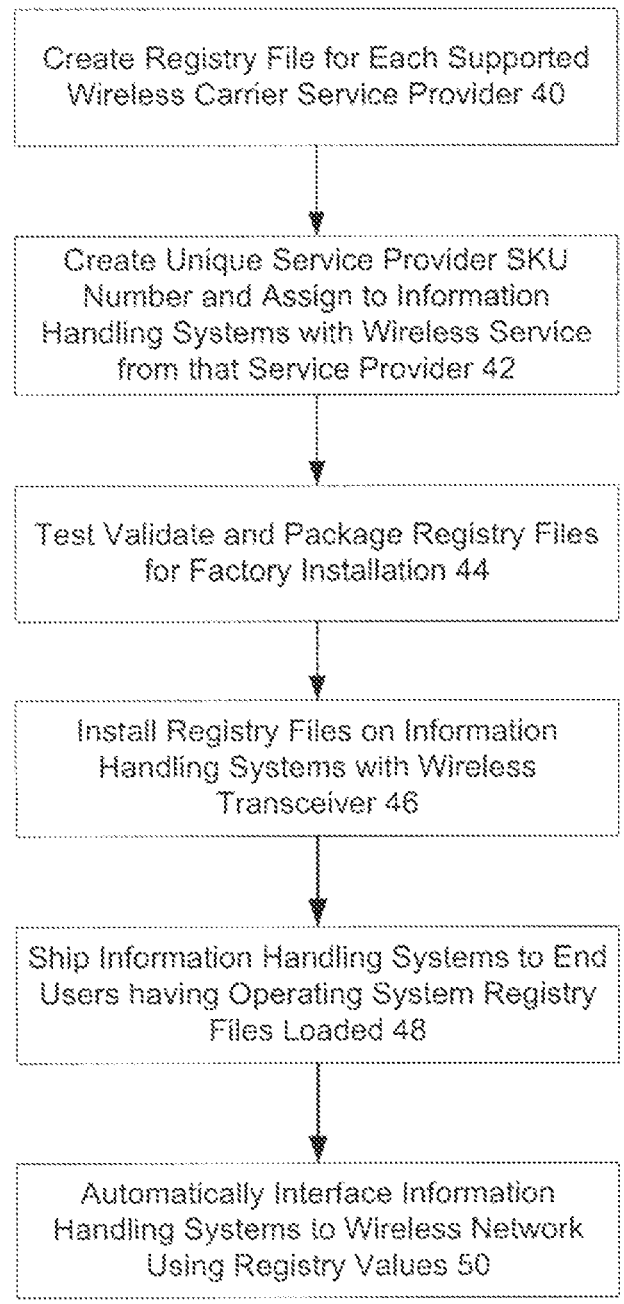
FIG. 2 depicts a flow diagram of a process for manufacture of an information handling system having a wireless wide area network capability installed, configured and provisioned upon initial start up by a purchaser.

Referring now to FIG. 2, a flow diagram depicts a process for manufacture of an information handling system having a wireless wide area network capability installed, configured and provisioned upon initial start up by a purchaser. The process begins at step 40 with creation of a registry file for each supported wireless service provider that supports provisioning of an information handling system to a network of the supported wireless provider. At step 42, a unique identifier, such as a SKU number, is assigned to each registry file so that information handling systems can have the registry file identified and loaded in an image based on the service provider associated with the wireless service of the information handling system. Based on the identifier, each information handling system has a registry file loaded to its image that matches the wireless service associated with the information handling system. At step 46, the appropriate registry file is loaded on each information handling system with a wireless transceiver so that the wireless service is prepared for provisioning on the information handling system. At step 48, the information handling system ships to the end user with the registry files loaded in the operating system so that, upon initial start up, the information handling system will automatically provision to the appropriate wireless network. At step 50, upon power up, the information handling system automatically interfaces information handling systems to the wireless network with the registry values found in the registry files.

Although the present invention has been described in detail, it should be understood that various changes, substitutions and alterations can be made hereto without departing from the spirit and scope of the invention as defined by the appended claims.

What is claimed is:

1. A system for manufacture of an information handling system, the system comprising:
    an order engine operable to accept information handling system orders from an end user, each order having a wireless service provider of the end user and having associated purchasing information;
    a wireless service provider registry database having plural wireless service provider registry entries, each wireless service provider registry entry associated with a wireless service provider;
    an end user wireless registry engine operable to analyze the purchasing information to generate an end user wireless service registry; and
    an image engine interfaced with the order engine, the wireless service provider registry database and the end user wireless registry engine, the image engine operable to generate an image for the orders, each image having an operating system, the operating system having a wireless service provider registry entry and an end user wireless service registry entry that define wireless service for the information handling system according to the order;
    wherein the wireless service provider registry entry comprises provisioning information to provision wireless service for the information handling system and the image further comprises a wireless provisioning engine operable to automatically provision wireless service on initial power up of the information handling system.

2. The system of claim 1 wherein the end user wireless service entry comprises a wireless carrier service to provide wireless service to the information handling system.

3. The system of claim 2 wherein the wireless carrier service comprises a wireless protocol identification.

4. The system of claim 2 wherein the wireless carrier service comprises a wireless access point for the information handling system to interact with the wireless carrier service.

5. The system of claim 2 wherein the wireless carrier service comprises a DNS service for assigning network address information to the information handling system.

6. The information handling system of claim 1 wherein the image engine is further operable to analyze the wireless service registry entry to select a wireless driver for operating a wireless radio of the information handling system.

7. The information handling system of claim 6 wherein the wireless driver operates the wireless radio by a GSM protocol.

8. The information handling system of claim 6 wherein the wireless driver operates the wireless radio by a CDMA protocol.

9. The system of claim 1 further comprising an update engine operable to interface with an information handling system having a wireless service registry entry to update the wireless service registry entry for modifying wireless service at the information handling system.

10. A method for manufacture of an information handling system, the method comprising:
    accepting an order for the information handling system from an end user, the order having a wireless service provider and associated purchasing information;
    selecting a wireless service provider registry entry for the order from a database having a plurality of wireless service provider registry entry, each wireless service provider registry entry associated with a wireless service provider;
    generating an end user wireless service registry entry from the purchasing information;
    creating an image to load to the information handling system, the image having an operating system with the selected wireless service provider registry entry and the end user wireless service registry entry;
    copying the image to an information handling system having a wireless service radio; and
    upon initially powering up the information handling, automatically provisioning the wireless service radio with the wireless service provider registry entry and the end user wireless service registry entry.

11. The method of claim 10 wherein the end user wireless service entry comprises a wireless carrier service to provide wireless service to the information handling system.

12. The method of claim 11 wherein the wireless carrier service comprises a wireless protocol identification.

13. The method of claim 11 wherein the wireless carrier service comprises a wireless access point for the information handling system to interact with the wireless carrier service.

14. The method of claim 11 wherein the wireless carrier service comprises a DNS service for assigning network address information to the information handling system.

15. The method of claim 10 further comprising:
    analyzing the wireless service registry entry to select a wireless driver for operating a wireless radio of the information handling system; and
    copying the selected wireless driver to the image.

16. The method of claim 15 wherein the wireless driver operates the wireless radio by a GSM protocol.

17. The method of claim 15 wherein the wireless driver operates the wireless radio by a CDMA protocol.

18. The method of claim 10 further comprising:
    shipping the information handling system to an end user; and
    updating the information handling system through a network, the update modifying the wireless service registry entry for modifying wireless service at the information handling system.

* * * * *